Jan. 13, 1959    H. D. SQUIRE    2,867,862
REFRIGERATOR DOOR GASKET
Filed Aug. 8, 1955
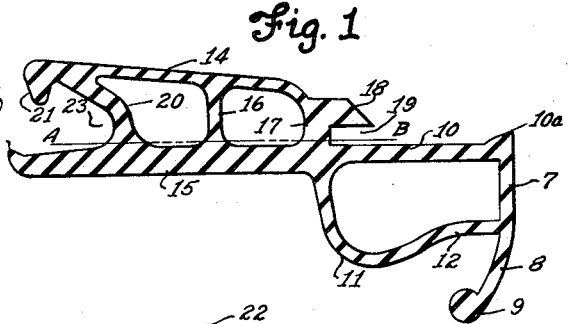
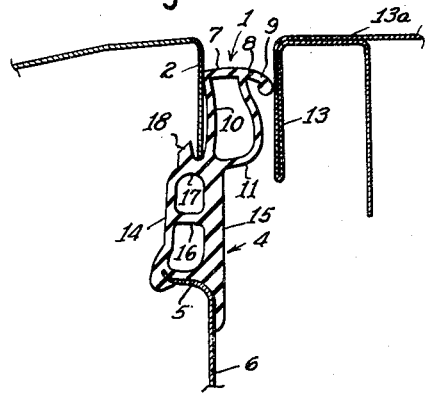
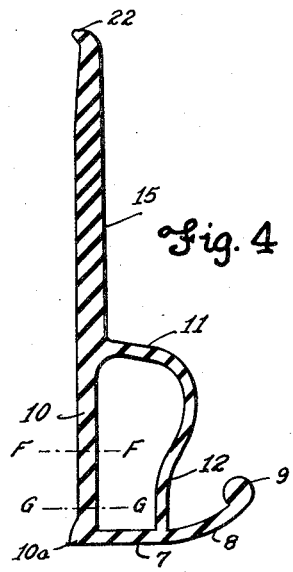
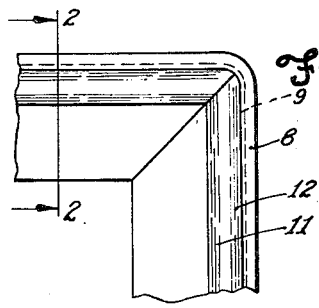
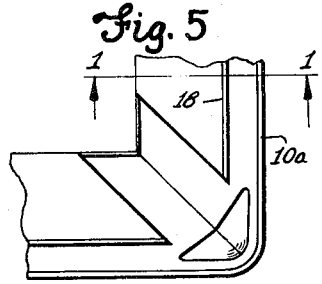
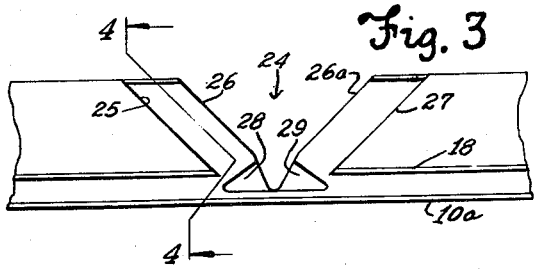
INVENTOR.
HERBERT D. SQUIRE
BY

United States Patent Office 2,867,862
Patented Jan. 13, 1959

2,867,862

REFRIGERATOR DOOR GASKET

Herbert D. Squire, Galesburg, Ill., assignor to Midwest Manufacturing Corporation, Galesburg, Ill., a corporation of Illinois Application August 8, 1955, Serial No. 526,924

5 Claims. (Cl. 20—69)

The present invention relates to a door seal and to a combined door seal and breaker strip for application to a refrigerator door.

In refrigerators as presently constructed, it is the practice to provide a seal between the door and the frame of the cabinet to prevent the ingress and egress of air into and from the food compartment of the refrigerator and to also provide a breaker strip, formed of insulating material, between the shell of the door and its inner central panel.

For providing a seal between the door and shell of the cabinet of a refrigerator, a gasket has heretofore been utilized having a convex front wall, the highest point of which is provided with a rib which supports a bead. The rib and bead are usually inclined at an angle relative to the convex wall of the gasket and are easily deformable to conform to the irregularities of the cabinet. Such gaskets are usually formed of a resilient material, such as rubber or rubber-like material which is extruded through a suitable die and is then cured. When the rib is comparatively wide, it is difficult, however, to maintain the rib and the cylindrical bead at the desired angle relative to the convex wall because under such conditions, the bead and its supporting rib have the tendency to collapse toward the convex wall of the gasket while the rubber is being cured and as a consequence when the door is closed, it is necessary to provide sufficient force to compress not only the bead and rib but also a portion of the convex wall of the gasket to provide an effective seal between the door and the cabinet. When a gasket having a convex outer wall is utilized, it has therefore been found desirable to provide a web connected at one of its edges to the bead and at its other edge to the convex portion of the gasket when the rubber is extruded which web may be removed, if desired, after the extruded material is cured, as disclosed more particularly in the copending application Serial No. 496,800 filed March 25, 1955, of Evans T. Morton, now United States Letters Patent 2,823,430, issued February 28, 1958.

According to the present invention, I have provided an improved gasket for attachment to the shell of a refrigerator door including an outer straight or substantially straight wall which is supported in place by rear and front walls and on which a web and bead are formed as an extension of the outer wall. The web and bead are inclined inwardly at an angle relative to the outer wall and the outer end portion of the front supporting wall is inclined rearwardly at an angle opposite to that at which the rib and bead are inclined to provide a clearance space or recess into which the rib and bead may be resiliently bent when the door of the refrigerator is closed. While my improved gasket may be connected to an inwardly extending flange on the shell of the door in any desirable manner, it is preferably formed integral with a breaker strip which is composed of front and rear spaced walls and the outer end of the bracket strip and the rear wall of the gasket are spaced from each other to provide a slot for receiving the inwardly extending flange on the door shell. It will be understood however, that the gasket per se is not limited in its application to any particular type of breaker strip and may be used merely as a gasket without any breaker strip.

In accordance with the present invention, the breaker strip and the gasket may be formed from a rectangularly shaped strip of a rubber-like material and to enable the gasket and strip to be formed into the shape of a frame for application to the door of a refrigerator, substantially V-shaped cut-outs are formed in the strip at those portions which are to be bent to form the corners. The rear wall and the webs of the breaker strip are removed at the margins of the strip adjacent the cut-outs, and additional V-shaped cut-outs are formed in the rear wall of the gasket portion of the strip at such margins to enable the strip to be bent into a square or rectangular shape in which it may be readily connected to the inwardly extending flanges of the panel to form the combined gasket and breaker strip. This mounting of the combined gasket and breaker strip on the panel is referred to in the copending application to which reference has been made and as to such features as are disclosed therein.

It is therefore an object of the present invention to provide an improved gasket for providing a seal between the door of a refrigerator and the wall of a cabinet in which the gasket is composed of a substantially straight outer wall having an extension thereon to provide a rib and a cylindrical bead which rib and bead are inclined inwardly and forwardly from the outer wall and in which the straight outer wall is supported by a front wall, the outer end portion of which is inclined at an angle opposite to the inclination of the rib and bead to provide a space into which the rib and bead may be resiliently bent when the door is closed.

Another object of the invention is to provide an improved seal for refrigerator doors including a gasket having a substantially straight outer wall which terminates in an inwardly and forwardly inclined rib and bead, a rear wall having means associated therewith for connecting the gasket to an inwardly extending flange on the door, and a front supporting wall, the outer end portion of which is inclined outwardly and rearwardly at an angle opposite to that at which the rib and bead of the outer wall are inclined to provide a space into which the rib and the bead may be resiliently bent when the door is closed.

A further object of the invention is to provide an improved gasket in combination with a breaker strip in which the breaker strip is provided with a central web for maintaining the front wall of the breaker strip and the front wall of the gasket firmly in place.

Another object of my invention is to provide a door gasket having a highly flexible sealing bead which gasket may be cut to conform to square corners without disturbing the effectiveness of the sealing bead.

A still further object of the invention is to provide an improved combined gasket and breaker strip in the form of a frame for application to a refrigerator door.

My invention will be better understood by reference to the accompanying drawings in which:

Fig. 1 is a cross sectional view of the combined gasket and breaker strip taken on a plane passing through the line 1—1 of Fig. 5;

Fig. 2 is a cross sectional view taken on a plane passing through the line 2—2 of Fig. 6, showing portions of a refrigerator door and the shell of a cabinet with the gasket and breaker strip in place;

Fig. 3 is a rear plan view of a rectangular strip having cut-outs therein to enable the strip to be bent into the form of frame;

Fig. 4 is a cross sectional view taken on a plane passing through the line 4—4 of Fig. 3; and Figs. 5 and 6 are rear and front views of portions of the frame formed from the strip shown in Fig. 3.

As illustrated in Figs. 1 and 2 of the drawings, my improved structure comprises a gasket 1 which is adapted to be secured to an inwardly extending flange 2 on the outer shell 3 of a refrigerator door in any desired manner. As shown in the drawings, the gasket 1 is supported by a breaker strip 4 which is arranged between the inwardly extending flange 2 on the shell of the door and a rearwardly extending flange 5 on the front door panel 6.

The gasket which constitutes one of the important features of the present invention consists of a substantially straight or slightly curved outer wall 7 which has a curved extension comprising a web 8 and preferably terminates in a bead or thickened portion 9. The gasket also comprises a rear wall 10 which terminates in a bead 10a, a well 11 which extends forwardly from the inner end of the rear wall 10 and is then inclined outwardly and rearwardly at an angle which is opposite to the inclination of the rib 8 and bead 9 to provide a front wall.

It will be appreciated that this bead may be hollow or take other configurations among which is included a curled over edge, and, that under some circumstances, it may be desirable to eliminate the bead entirely.

As shown in Fig. 2, the outer wall 7 and its extension are so arranged relative to the shell of the door that the bead 9 will engage an inwardly extending flange 13 on the shell 13a of the cabinet when the door of the refrigerator is closed. Because the front supporting wall of the gasket is inclined in a direction opposite to the inclination of the rib 8 and bead 9, a space 12 is provided into which the rib 8 and the bead 9 may be resiliently bent when the refrigerator door is closed. An effective seal may therefore be formed between the door of the refrigerator and the shell of the cabinet without exerting heavy pressure upon the door, even in the presence of non uniformities in the contacting flange of the cabinet.

While my improved gasket may be secured to the inwardly extending flange on the shell of the door in any desirable manner, I have found it desirable to form the gasket and the breaker strip of a composite rubber-like material which is not only resilient but which has heat insulating properties. As shown in Figs. 1 and 2, the breaker strip 4 consists of a rear wall 14 and a front wall 15 which are spaced from each other to form an air chamber. The front wall 15 of the breaker strip is formed as a continuation of the rear wall of the gasket and because it serves as a support for the gasket, it is preferably made of somewhat heavier material than the rear wall of the gasket and the rear wall of the breaker strip and is reinforced by a web 16 which extends between the rear and front walls of the breaker strip.

The rear wall 14 of the breaker strip is also connected to the front wall 15 by a web 17 which is provided with an outwardly extending rib 18 which is spaced from the rear wall 10 of the gasket to provide a slot 19 into which the flange 2 of the shell of the door extends. The inner end portion of the breaker strip, which is inclined rearwardly, is provided with an inclined web 20 extending between rear wall 14 and the front wall 15 which together with a forwardly inclined hook portion 21 on the inner end of the rear wall 14 of the breaker strip and a rearwardly inclined bead 22 on the inner end portion of the front wall provides a channel 23 into which the rearwardly and outwardly inclined flange 5 of the panel may be inserted.

In accordance with the present invention, I have provided the gasket and breaker strip in the form of a frame for insertion in the door of the refrigerator. For this purpose, the combined breaker strip and gasket is extruded in the form of a rectangular strip, a transverse cross section of which is shown in Fig. 1 and after the material is cured, substantially V-shaped openings 24 are cut in the strip at those portions of the strip which are to form the corners of the frame and at the margins of the strip adjacent each edge of the V-shaped openings, the rear wall of the breaker strip and the webs 20, 16 and 17 are removed as indicated by the dotted line A—B in Fig. 1 of the drawings. As shown in Fig. 3, the rear wall and the webs of the breaker strip may be removed from the portion of the strip between one edge 26 of the cutout to a distance designated by line 25 and on the opposite edge of the V-shaped opening, the rear breaker strip 14 and the webs are cut out from the edge 26a of the opening to a distance designated by the line 27. The margin of the strips adjacent the V-shaped opening will therefore be as shown in Fig. 4. I also form in the rear wall of the gasket 10 substantially V-shaped cut-outs as indicated by the numerals 28 and 29 in Fig. 3 and diagrammatically by the lines F—F and G—G in Fig. 4 of the drawings. The strip is then bent into a substantially square or rectangular frame depending upon the size and shape of the door, a view from the rear of which is shown in Fig. 5 and a view from the front of which is shown in Fig. 6. It will be noted that the removal of the material, as indicated, leaves the sealing bead and web intact.

In applying the frame consisting of the breaker strip 1 and the gasket 4 to the refrigerator door, it is first arranged in a position in which the inwardly extending flanges 2 of the shell extends into the slots 19 formed by the rear wall of the gasket and the rib 18 of the breaker strip. The door panel 6 is then inserted in place. In assembling the panel, the front walls of the breaker strip are distorted sufficiently to enable the outer portions of the panel to be inserted in the channel 23. During the insertion of the panel in place, the flange 5 exerts pressure on the hook portions 21 of the rear wall of the breaker strip which finally snaps over outwardly inclined portions 5a of flange 5. The forward pressure upon the front wall of the panel also straightens out or tends to straighten out the hook portion 22 on the front wall of the breaker strip as shown in Fig. 2.

Having thus described my invention, it will be appreciated that the structure shown has been selected merely for purposes of illustration and that various changes in the parts may be made without departing from the spirit and scope of the invention as defined in the appended claims.

I claim:

1. An elongated gasket of deformable, resilient material comprising a base for mounting the gasket in place, an outer wall connected to the outer end of the base and extending forward therefrom transversely of the base, a front wall connected at its outer end to said outer wall and extending inwardly therefrom in spaced relation to the base and connected at its inner end to the base in spaced relation to the latter's outer end, said base, outer wall and front wall defining a hollow space, said gasket intermediate its length having a cut in its base and its front wall which in the unbent condition of the gasket is open at the inner end of the gasket and is defined by opposite edges which converge toward each other in a direction toward the outer wall of the gasket, said rear wall having oppositely disposed cuts therein adjacent the outer wall which communicate with said first-mentioned cut and extend laterally therefrom in opposite directions, said gasekt being bent about said first-mentioned cut and having said opposite edges of the cut abutting against each other, and a rib connected to said outer wall at the juncture of said front wall therewith, said rib extending forward and inward from its connection to said outer wall across the front of said front wall and being deformable to bring its free end into engagement with said front wall intermediate the latter's ends.

2. A gasket of deformable, resilient material comprising a rear wall, an outer wall connected to the outer end of said rear wall and extending forward therefrom transverse to said rear wall, a front wall comprising a convex segment connected to said rear wall at a location thereon spaced inward from said outer wall, said convex segment extending forward away from said location on the rear wall and then curving outward toward said outer wall and forward to its forward extremity and from its forward extremity continuing outward toward said outer wall and rearward back toward said rear wall, and a straight segment connected at one of its ends to the outer end of said convex segment at a location disposed rearward from the forward extremity of said convex segment to define therewith a forwardly facing recess, said straight segment being connected at its other end to said outer wall at a location thereon spaced forward from said rear wall and rearward from the forward extremity of said convex segment, said rear wall, outer wall and front wall defining a hollow space between them, and a rib connected to said outer wall at the juncture of said straight segment of the front wall therewith and extending forward as a smooth continuation of said outer wall and inward across said straight segment in spaced relation to said straight segment forward of said straight segment and terminating in a free end disposed forward and outward beyond said outer extremity of the convex segment of the front wall, said rib being deformable into said recess to engage said front wall thereat.

3. An elongated integral breaker strip and gasket of deformable, resilient material, said breaker strip comprising a front wall, a back wall, and spaced webs which interconnect said front and back walls, said gasket comprising a rear gasket wall which forms a smooth continuation of said front wall of the breaker strip and extends outward therefrom, an outer gasket wall connected to the outer end of said rear gasket wall and extending forward transversely therefrom, and a front gasket wall comprising a convex segment connected to said rear gasket wall at the latter's connection to the front wall of the breaker strip, said convex segment extending forward away from the rear gasket wall and then curving outward toward the outer gasket wall and forward to its forward extremity and from its forward extremity continuing outward toward said outer gasket wall and rearward back toward said rear gasket wall, and a straight segment connected at one of its ends to the outer end of said convex segment at a location disposed rearward from the forward extremity of said convex segment to define therewith a forwardly facing recess, said straight segment being connected at its other end to said outer gasket wall at a location thereon spaced forward from said rear gasket wall and rearward from the forward extremity of said convex segment, said rear gasket wall, outer gasket wall and front gasket wall defining a hollow space between them, a rib connected to said outer gasket wall at the juncture of said straight segment of the front gasket wall therewith and extending forward as a smooth continuation of said outer gasket wall and inward across said straight segment in spaced relation to said straight segment, said rib being deformable into said recess to engage the front gasket wall thereat, said rib at its forward end terminating in an enlarged bead, said integral breaker strip and gasket intermediate its length having a cut therein which in the unbent condition of the breaker strip and gasket is open at the inner end of the breaker strip and is defined by opposite edges which converge toward each other in a direction outward from the inner end of the breaker strip, said cut extending through the front wall of the breaker strip and into the rear gasket wall and the front gasket wall and terminating thereat, said rear gasket wall having oppositely disposed cuts therein adjacent the outer gasket wall which communicate with said first-mentioned cut and extend laterally in opposite directions away from said first-mentioned cut, said breaker strip having its rear wall and webs removed immediately adjacent said first-mentioned cut, said integral breaker strip and gasket being bent about said first-mentioned cut and having said opposite edges of the cut abutting against each other throughout their length.

4. An integral breaker strip and gasket of deformable material, said gasket comprising a rear wall connected to and extending outwardly from the breaker strip, an outer wall connected to the outer end of said rear wall and extending forward from said rear wall, and a front wall connected at its outer end to said outer wall and extending inwardly therefrom in spaced relation to the rear wall and connected at its inner end to the rear wall in spaced relation to the latter's outer end, said breaker strip and gasket having a cut therein which in the unbent condition of the breaker strip and gasket is open at the inner end of the breaker strip and is defined by opposite edges which converge toward each other in a direction outward from the inner end of the breaker strip, said cut extending into the rear and front walls of the gasket and terminating thereat, and said rear wall of the gasket having oppositely-disposed openings therein adjacent the outer wall of the gasket which extend laterally from said cut in opposite directions, said breaker strip and gasket being bent about said cut and having said opposite edges of the cut abutting against each other throughout their length.

5. An integral breaker strip and gasket of deformable resilient material, said breaker strip comprising a substantially straight front wall, a back wall, and spaced webs which interconnect said front and back walls, said gasket comprising a rear wall which extends outward as a continuation of said front wall of the breaker strip, said breaker strip and gasket having a cut therein which in the unbent condition of the breaker strip and gasket is open at the inner end of the breaker strip and is defined by opposite edges which converge toward each other in a direction outward from the inner end of the breaker strip, said cut terminating in the gasket adjacent the latter's outer end, said rear gasket wall having oppositely disposed openings therein adjacent the outer end of the gasket which communicate with said cut and extend laterally in opposite directions therefrom, said breaker strip on opposite sides of said cut having its back wall and webs removed, and said integral breaker strip and gasket being bent about said cut and having said opposite edges of the cut abutting against each other.

References Cited in the file of this patent

UNITED STATES PATENTS

| | | |
|---|---|---|
| 1,641,157 | Cook | Sept. 6, 1927 |
| 2,256,206 | Knight | Sept. 16, 1941 |
| 2,607,091 | Dodge | Aug. 19, 1952 |
| 2,636,228 | Morton | Apr. 28, 1953 |
| 2,665,456 | Morton | Jan. 12, 1954 |